United States Patent [19]

Choate

[11] Patent Number: 5,607,769

[45] Date of Patent: Mar. 4, 1997

[54] COMPOSITE MATERIAL

[75] Inventor: Martin T. Choate, Winona, Minn.

[73] Assignee: Fiberite, Inc., Tempe, Ariz.

[21] Appl. No.: 286,058

[22] Filed: Aug. 4, 1994

[51] Int. Cl.$^6$ ................................................. B32B 9/00
[52] U.S. Cl. ........................... 428/408; 428/511; 428/902
[58] Field of Search ................................ 428/288, 289, 428/290, 291, 255, 245, 236, 408; 418/902, 511

[56] References Cited

U.S. PATENT DOCUMENTS

| | | | |
|---|---|---|---|
| 3,842,144 | 10/1974 | Tanaka et al. | 525/83 |
| 3,985,704 | 10/1976 | Jones et al. | 260/42.32 |
| 4,379,876 | 4/1983 | Clikeman et al. | 524/109 |
| 4,446,255 | 5/1984 | Ying et al. | 523/205 |
| 4,446,262 | 5/1984 | Okumura et al. | 524/89 |
| 4,529,755 | 7/1985 | Nishikawa et al. | 523/436 |
| 4,719,255 | 1/1988 | Yoshizumi et al. | 523/436 |
| 4,904,760 | 2/1990 | Gaku et al. | 528/422 |
| 4,916,174 | 4/1990 | Yoshizumi et al. | 523/436 |
| 5,122,417 | 6/1992 | Murakami et al. | 428/408 X |
| 5,128,199 | 7/1992 | Iyer et al. | 428/408 X |
| 5,149,584 | 9/1992 | Baker et al. | 428/408 X |
| 5,216,077 | 6/1993 | Yoshizumi et al. | 525/68 |
| 5,360,861 | 11/1994 | Campbell | 524/494 |

*Primary Examiner*—James J. Bell
*Attorney, Agent, or Firm*—Gray Cary Ware & Freidenrich

[57] ABSTRACT

Fiber reinforced prepregs containing a methacrylate butadiene styrene modified thermoset resin are particularly useful in the fabrication of electrical and office equipment enclosures.

4 Claims, No Drawings

COMPOSITE MATERIAL

BACKGROUND OF THE INVENTION

1. Field of the Invention

The present invention relates to fiber reinforced prepregs containing a thermoplastic (methacrylate butadiene styrene) modified thermoset resin and to molded articles prepared from such prepregs.

2. Description of the Prior Art

Electrical and office equipment enclosures, such as computer cases, copier cases and telecommunications equipment, have previously been prepared from thermoplastic resins such as polycarbonates, acrylonitrile butadiene sytrene (ABS) and polypropylene. These materials have the advantageous properties of toughness, flexibility and the ability to meet UL specifications by including fire retardant additives. However, the thermoplastics have the disadvantages of not being stiff due to their low modulus and an inability to flow into detailed molds due to their inherently high (molecular weight) melt viscosity. The high melt viscosity also results in an inability to be compounded with much more than 10 to 40% chopped fiber reinforcement resulting in less than half the modulus values obtainable with thermosets even when such compounded thermoplastics are used. Also because of the relatively high melt viscosities and lower modulus, thicker wall sections and, in some cases, ribs must be designed into molded parts to provide adequate rigidity and help to prevent burn (melt) through during flammability testing. As a practical matter, it is exceedingly difficult to mold wall sections much less than 0.080" thick due to the thermoplastic resins high melt viscosity and subsequent inability to flow into wall cavities this narrow with conventional injection molding equipment. The thermoplastics also exhibit the phenomena of melting when heat is applied. This phenomena has required the flammability test UL 94 5 V itself (burn through test) to be modified so that the gas flame source is angled 20 degrees under the specimen to prevent melted material from dripping into the flame.

One way to overcome the disadvantages of melting (distortion) and the need for thick wall designs due to low modulus would be to use a thermoset resin. However, the conventional thermoset resins (i.e, epoxies and phenolics) are not tough enough for these applications resulting in cracking due to their relatively low impact strength.

SUMMARY OF THE PREFERRED EMBODIMENTS

The present invention relates to a prepreg particularly suitable for use in the fabrication of electrical and office equipment enclosures. The prepreg comprises a substrate, preferably a carbon paper, impregnated with a resin composition comprising a methacrylate butadiene styrene (MBS) modified thermoset resin.

DESCRIPTION OF THE INVENTION

The present invention is a prepreg comprising a modified thermoset resin impregnated on and into a substrate. Each of these components is described separately below. As is known to those skilled in this art the term "prepreg" refers to a combination of a substrate such as a mat, fabric, nonwoven material or roving with a resin, usually advanced to the B stage, ready for curing. In the cure cycle of a thermosetting resin, the A stage refers to the early stage in the reaction of the resin in which the resin is still soluble and fusible. The B stage is an intermediate stage in the reaction in which the thermosetting resin melts when heated and still dissolves in certain solvents. In production the treated substrate is usually precured to this stage to facilitate handling and processing prior to final cure. The C stage is the final stage in curing the thermosetting resin in which the resin becomes infusible and insoluble in common solvents.

Resins

The resin component employed in the prepregs of the present invention is a methacrylate butadiene styrene (MBS) modified thermoset.

The preferred thermoset component is a phenol formaldehyde resin—i.e. a formaldehyde condensate with a melamine phenol. These are often referred to as "phenolic" resins. The phenolic resins may be of either the novolak or resole type. However, the novolaks are preferred due to the lower amount of free phenol and/or formaldehyde in these resins. Both the novolaks and resoles are phenol formaldehyde resins. The differences result primarily from the ratio of phenol to formaldehyde used in the preparation of the resins. The resole resins are typically prepared with a molar excess of formaldehyde to phenol typically in the range of 1:1.5–2 under alkaline conditions. Novolak resins are prepared with an excess of phenol to formaldehyde usually about 1.25:1 under acidic conditions (with oxalic or hydrochloric acid). In the resole resin a trace amount of nitrogen is added to the resin slurry usually in the form of ammonia bubbled through the liquid or hexamethylenetetramine powder is mixed in to help promote reaction between the phenol and formaldehyde. The resole type resin is a relatively lower molecular weight (highly monomeric) semisolid or even liquid resin. It tends to be less stable then the more highly polymerized solid novolak resin at ambient temperatures. The phenol formaldehyde resins are well known and are described in the literature, for example in K. J. Saunders, *Organic Polymer Chemistry* Chapman and Hall, New York 1985 and A. Knap—L. A. Pilato, *Phenolic Resins Chemistry, Applications and Performance*, Springer—Verlog, New York 1985.

Methacrylate butadiene sytrene copolymers are commercially available materials and have previously been used as impact modifiers for polyvinyl chloride (PVC). See, for example, U.S. Pat. No. 3,985,704.

Preferred MBS polymers are core-shell copolymers prepared in two or more stages where the core is about 90 to 50 parts of polybutadiene, or copolymers of butadiene with up to 50 percent styrene, lower alkyl (e.g., methyl or ethyl) acrylate, lower alkyl (e.g., methyl or ethyl) methacrylate, acrylonitrile, olefins, and the like, and the shell is about 10 to 50 parts of a lower alkyl methacrylate, especially methyl methacrylate, lower alkyl acrylate, styrene and/or acrylonitrile, with optional crosslinking and/or graftlinking monomers. The MBS polymer can also have the relationship of the core to the shell reversed.

Especially preferred are the MBS copolymers available from Rohm and Haas Company as Paraloid BTA730 or Paraloid BTA753.

The thermoset resin may be modified with the methacrylate butadiene styrene either during preparation of the thermoset resin or subsequently by blending the MBS into the thermoset. Preferably, MBS is added to the phenolic novolak during the "resin cook period" in the resin manufacturers reaction kettle. As used herein the term "methacrylate butadiene sytrene modified thermoset resin" refers to a composition comprising a thermoset resin and methacrylate butadiene styrene irrespective of whether the MBS is added to the thermoset during preparation of the thermoset or after its preparation.

Other thermoset resins, modified with MBS, may also be utilized. These include urea formaldehyde resins and other thermoset resins such as epoxidised phenolic novolacs, bisphenol A epoxies, polyesters and vinyl ester resins.

Substrate

The substrate employed in the present invention may be of any discontinuous fiber including carbon, glass, Kevlar® or other conventional fiber reinforcements. Preferred results are achieved with a carbon paper substrate having a weight of 3 ounces per square yard. This material permits the prepreg manufacturer to achieve a higher prepregging throughput, and customers have fewer sheets to cut for a given charge weight. The preferred carbon paper is prepared from PAN fibers. PAN refers to fiber or filler made from polyacrylonitrile starting resin. Lower weight materials such as those having weights of 2 and 2.5 ounces per square yard may also be used. A preferred substrate contain 50% by weight of 0.5 inch length and 50% by weight of 1.0 inch length carbon fibers. The length of the fibers can be varied depending upon the article being prepared from the prepreg and/or the mechanical properties required in the article Preparation of Prepreg As used herein the term "prepreg" refers to a combination of a fibrous substrate impregnated with a resin composition.

A composition is prepared by dissolving the MBS modified thermoset resin in a suitable solvent for the resin. Solvents which may be used include acetone, methyl ethyl ketone, methylene chloride or any other low boiling point (less than 60 degrees C.) solvent. To the resulting solution there may be added additives, for example pigments, flame retardants, lubricants or cure accelerators (e.g. hexamethylenetetramine).

Preferred results are achieved when a fire retardant material is included in the composition. Suitable fire retardant materials include halogen/antimony compounds including, for example, tetrabrominated bis-phenol A and antimony oxide. Especially preferred results are achieved with a phosphate ester such as Hoechst Celanese AP422 or IFR 23.

The substrate is impregnated with the resin solution by means which are conventional in the art. In general, the paper is run through the solution followed by drying to remove the solvent and partially cure the resin composition to the B stage. The resulting prepreg may be sheeted, stacked or rolled and shipped or stored.

Preparation of Molded Articles

Molded articles may be prepared from the prepregs of the present invention by means which are well known to those skilled in the art including compression and transfer molding. The prepeg may be molded into highly detailed pieces with wall thicknesses as thin as 1 millimeter. The details of the molding process, such as cure cycle, temperature and pressure, may be varied depending upon the configuration of the part being produced. In general, several sheets of the prepreg are cut and stacked in a mold. The arrangement of the sheets depends upon the article being produced. For example extra strips or pieces of the prepreg can be included where extra strength is required in the final article. The prepregs of the present invention provide a design advantage in allowing for the preparation of molded articles having thinner wall sections due to the lower melt viscosity of the resins resulting in lighter weight enclosures having increased internal volume.

In order to describe the present invention so that it may be more clearly understood, the following examples are set forth. These examples are set forth primarily for the purpose of illustration and any specific enumeration of detail contained therein should not be interpreted as a limitation on the concept of this invention.

In the examples. the following materials and test procedures were used.

HRJ 10985 refers to an MBS modified phenolic novolac resin available from Schenectady International, Inc. Schenectady, N.Y.

AP422 refers to HOSTAFLAN AP422, a phosphate ester flame retardant available from Hoechst Celanese Corp., Charlotte, N.C.

HEXA refers to Hexamethylenetetramine.

SOCCI wax refers to a Carnauba wax emulsion containing 50% solids in water.

BLACK solution refers to Carbon black/nigrosine solution.

20301 carbon paper refers to a 3 oz/yd, 50% 1 inch chop, 50% ½" chop, 5% PVA sized PAN based carbon fiber paper available from Technical Fibre Products Limited, Kendal, Cambria, England.

Flexural Strength and Flexural Modulus were measured by the procedure of ASTM D-790.

Tensile Strength, Tensile Modulus and Tensile Strain were measured by the procedure of ASTM D-638.

Instrumented Impact Energy at Failure was measured by the procedure of ASTM C-3763.

UL 94 VO and 945 V at 0.030" were measured by ASTM UL 94 VO and 945 V, respectively.

EXAMPLE 1

Preparation of Resin Solution

A resin solution was prepared by combining the following in which the amounts are in parts by weight based upon the total weight of the solution.

48 parts Acetone 18 parts AP422

62.5 parts HRJ 10985

1.0 parts Lime 10.0 parts Hexa 3.0 parts Socci Wax and stirring for approximately 10 minutes.

To the resulting solution there was added 2.5 parts of zinc stearate and the resulting solution was stirred for another 10 minutes. At the end of this time there was added 3.0% Black Solution and the resulting solution was stirred for another 3 minutes.

Preparation of Prepeg 20301 carbon paper from a roll was run at approximately 130 inches per minute through a bath containing the resin solution prepared above. The impregnated paper was run through a pair of driven stainless steel nip rolls set at a gap of from 0.018 to 0.024 inches to remove excess resin solution and achieve the desired pick-up of 78–80% by weight of the resin solution. The acetone solvent was removed by running the paper through convection heat in a forced air oven at 215°–250° F. The retention time in the convection heat zone was from 8–12 minutes. The result was a dry, tackless prepreg comprising about 80% solids by weight resin and 20% by weight carbon fiber. A sample of the prepreg was cured by heating for 80 seconds at from 150°–180° at from 1500–3200 psi in matched metal dies. The cured sample had the physical properties shown in the following table. By comparison a control sample prepared in the same way except that the resin solution contained an unmodified phenolic novolac resin of intermediate molecular weight having the same amine—phenolic ratio as that in Example 1 and containing 13 parts HEXA in the resin solution had the properties indicated as control in the table.

| PROPERTY | CONTROL SAMPLE | EXAMPLE 1 |
| --- | --- | --- |
| FLEXURAL STRENGTH Ksi, (MPa) | 32.3 (223) | 36.5 (252) |
| FLEXURAL MODULUS Ksi, (MPa) | 2.39 (15.8) | 2.64 (18.2) |
| INSTRUMENTED IMPACT ENERGY @ FAILURE ft. lbs. (J/m) | 2.0 (107) | 3.5 (187) |
| TENSILE STRENGTH Ksi, (MPa) | 27.0 (186) | 29.75 (205) |
| TENSILE MODULUS Ksi, (GPa) | 2.59 (17.9) | 2.6 (17.2) |
| TENSILE STRAIN % | 1.053 | 1.15 |
| UL 94VO AND 945V @ 0.030" | PASS | PASS |

What is claimed is:

1. A prepreg comprising
   (a) a carbon paper substrate impregnated with
   (b) a methacrylate butadiene styrene modified thermoset resin, wherein the paper comprises 50% by weight of 0.5 inch length and 50% by weight of 1 inch length carbon fibers.

2. A prepreg, as claimed in claim 1, wherein the resin is a methacrylate butadiene styrene modified phenolic novolac resin.

3. A prepreg, as claimed in claim 1, wherein the amount of resin is equal to about 80% by weight based on the total weight of the prepreg.

4. A molded article prepared from the prepreg of claim 1.

* * * * *